United States Patent
Basche et al.

(10) Patent No.: US 10,171,745 B2
(45) Date of Patent: Jan. 1, 2019

(54) EXPOSURE COMPUTATION VIA DEPTH-BASED COMPUTATIONAL PHOTOGRAPHY

(71) Applicant: Dell Products, LP, Round Rock, TX (US)

(72) Inventors: Todd Basche, Los Altos, CA (US); Rocco Ancona, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 433 days.

(21) Appl. No.: 14/587,462

(22) Filed: Dec. 31, 2014

(65) Prior Publication Data

US 2016/0191896 A1 Jun. 30, 2016

(51) Int. Cl.
| | |
|---|---|
| H04N 7/18 | (2006.01) |
| H04N 9/47 | (2006.01) |
| H04N 11/02 | (2006.01) |
| H04N 11/04 | (2006.01) |
| H04N 5/235 | (2006.01) |
| H04N 5/225 | (2006.01) |
| H04N 5/232 | (2006.01) |
| H04N 13/00 | (2018.01) |
| H04N 13/02 | (2006.01) |

(52) U.S. Cl.
CPC ......... *H04N 5/2353* (2013.01); *H04N 5/2256* (2013.01); *H04N 5/2354* (2013.01); *H04N 5/2355* (2013.01); *H04N 5/23216* (2013.01); *H04N 5/23232* (2013.01); *H04N 5/23293* (2013.01); *H04N 13/0007* (2013.01); *H04N 13/0011* (2013.01); *H04N 13/0025* (2013.01); *H04N 13/0037* (2013.01); *H04N 13/0271* (2013.01)

(58) Field of Classification Search
None
See application file for complete search history.

(56) References Cited

U.S. PATENT DOCUMENTS

| | | | | |
|---|---|---|---|---|
| 7,046,841 | B1 * | 5/2006 | Dow | G01C 11/00 |
| | | | | 345/419 |
| 9,749,532 | B1 * | 8/2017 | Hinkel | G02B 27/646 |
| 2001/0038705 | A1 * | 11/2001 | Rubbert | A61C 7/00 |
| | | | | 382/128 |

(Continued)

OTHER PUBLICATIONS

International Search Report and Written Opinion for International Application No. PCT/US2015/068118, dated May 6, 2016, 12 pages.

*Primary Examiner* — Talha M Nawaz
(74) *Attorney, Agent, or Firm* — Prol Intellectual Property Law, PLLC; H. Kenneth Prol

(57) ABSTRACT

A method and electronic information handling system provide recording a first image of a scene at a first exposure level using a three-dimensional (3D) camera, correlating distances from the 3D camera and exposure levels over a plurality of image elements of the first image, selecting an exposure parameter value for at least one of the plurality of image elements having a z-distance value falling within a range of z-distance values, recording a second image of the scene according to the exposure parameter value, and constructing a composite image based on at least a portion of the second image for the at least one of the plurality of image elements.

20 Claims, 5 Drawing Sheets

(56) References Cited

U.S. PATENT DOCUMENTS

| | | | |
|---|---|---|---|
| 2005/0162381 A1* | 7/2005 | Bell | G06F 3/011 |
| | | | 345/156 |
| 2008/0239316 A1* | 10/2008 | Gharib | G01B 11/24 |
| | | | 356/364 |
| 2008/0246759 A1* | 10/2008 | Summers | G06F 3/0304 |
| | | | 345/420 |
| 2009/0295907 A1* | 12/2009 | Kim | H04N 13/189 |
| | | | 348/43 |
| 2012/0044381 A1* | 2/2012 | Jannard | H04N 5/235 |
| | | | 348/229.1 |
| 2013/0223690 A1 | 8/2013 | Criminisi | |
| 2013/0258044 A1* | 10/2013 | Betts-Lacroix | H04N 13/0242 |
| | | | 348/36 |
| 2013/0300876 A1* | 11/2013 | Lebber | H04N 5/2353 |
| | | | 348/164 |
| 2015/0022638 A1* | 1/2015 | Saeki | G06T 7/0004 |
| | | | 348/46 |
| 2016/0116419 A1* | 4/2016 | Pavani | H04N 7/181 |
| | | | 348/87 |
| 2016/0292883 A1* | 10/2016 | Comport | G06T 7/204 |

* cited by examiner

EXPOSURE COMPUTATION VIA DEPTH-BASED COMPUTATIONAL PHOTOGRAPHY

FIELD OF THE DISCLOSURE

The present disclosure generally relates to information handling systems, and more particularly relates to image processing.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Exposure algorithms in digital cameras today utilize zone-based metering options such as partial, evaluative zone or matrix, center-weighted and spot metering to determine exposure time, aperture and ISO. This approach can sometimes yield unacceptable results, for instance when the exposure calculation for the foreground subject of interest is influenced by the background subject of less interests light level as shown below. Exposure computation via depth-based computational photography can provide a more natural photograph of higher dynamic range by matching exposure compensation to discrete compositional zones. Today's tablet camera solutions generally leverage camera algorithms from compact digital cameras and phones, which are not optimal for tablet cameras. By implementing a solution that segments a scene based on depth, a foreground subject of interest can more accurately determined based on its depth in three-dimensional (3D) space rather than by merely assuming a portion of a scene at a typically central location is a subject of interest. The scene can then be decomposed by distance/exposure and appropriate illumination levels determined. Correct exposure parameters (such as a modulated flash, shutter speed and aperture) can then be applied to correctly illuminate each segmented focal zone. With a depth map, the scene can then be recomposed with correct illumination of the foreground and background.

Figure 1:
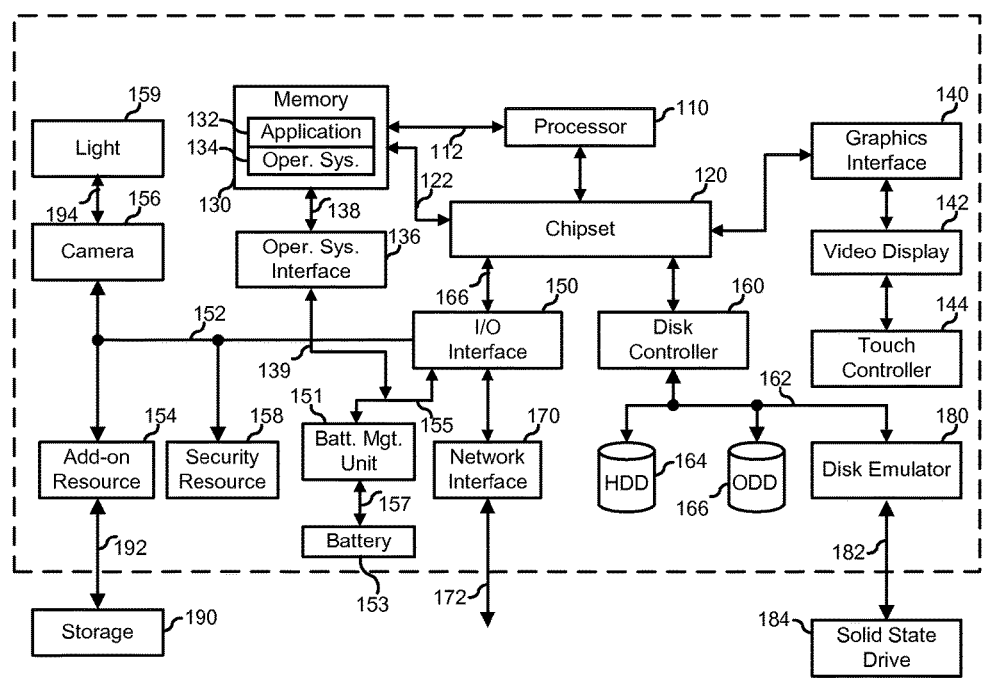
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 110 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to camera 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof. Camera 156 is connected to light 159 via connection 194. Light 159 can be controlled to provide illumination of objects of which a photograph or video is being recorded using camera 156.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

In accordance with at least one embodiment, camera 156 of information handling system 100 comprises a three-dimensional (3D) camera. As an example, the 3D camera can be an INTEL® REALSENSE™ 3D camera or another 3D camera. As an example, a camera having multiple camera elements at diverse locations to yield parallax information can be used to determine distances of image elements from the camera. As another example, a camera having a focusable lens to yield differences in sharpness at different distances can be used to determine distances of image elements from the camera. Camera 156 can record a first image of a scene at a first exposure level. Processor 110 is coupled, for example, via chipset 120 and I/O interface 150, to camera 156. Information handling system 100 includes instructions to be executed by processor 110 stored in memory 130, which is connected to processor 110. The instructions cause the processor 110 to correlate distances from the 3D camera 156 and exposure levels over a plurality of image elements of the first image. The instructions cause processor 110 to select an exposure parameter value for at least one of the plurality of image elements. The instructions cause processor 110 to record a second image of the scene according to the exposure parameter value. The instructions cause processor 110 to construct a composite image based on at least a portion of the second image for the at least one of the plurality of image elements.

In accordance with at least one embodiment, the instructions cause processor 110 to select a second exposure parameter value for at least another of the plurality of image elements. The instructions cause processor 110 to record a third image of the scene according to the second exposure parameter value. The constructing further comprises constructing the composite image based on the at least the portion of the second image for the at least one of the plurality of image elements and based on at least a portion of the third image for the at least another of the plurality of image elements.

In accordance with at least one embodiment, the instructions for causing processor 110 to construct the composite image further comprise instructions for causing processor 110 to construct the composite image based on the at least a portion of the second image for the at least one of the plurality of image elements and based on at least a portion of the first image for at least another of the plurality of image elements. In accordance with at least one embodiment, the instructions cause processor 110 to control illumination of at least a portion of the scene including the at least one of the plurality of image elements based on the exposure parameter value. In accordance with at least one embodiment, information handling system 100 comprises an illumination source, such as light 159, configured to be modulated in accordance with the exposure parameter value. In accordance with at least one embodiment, the instructions cause processor 110 to select an attribute value of an attribute selected from a group consisting of an illumination source on the 3D camera, an exposure speed of the 3D camera, and a sensitivity of the 3D camera is based on the exposure parameter value. In accordance with at least one embodiment, the instructions for causing processor 110 to select the exposure parameter value for the at least one of the plurality of image elements further comprise instructions for causing processor 110 to select the exposure parameter value for a group of the plurality of image elements within a depth range of a distance of the distances.

Figure 2:
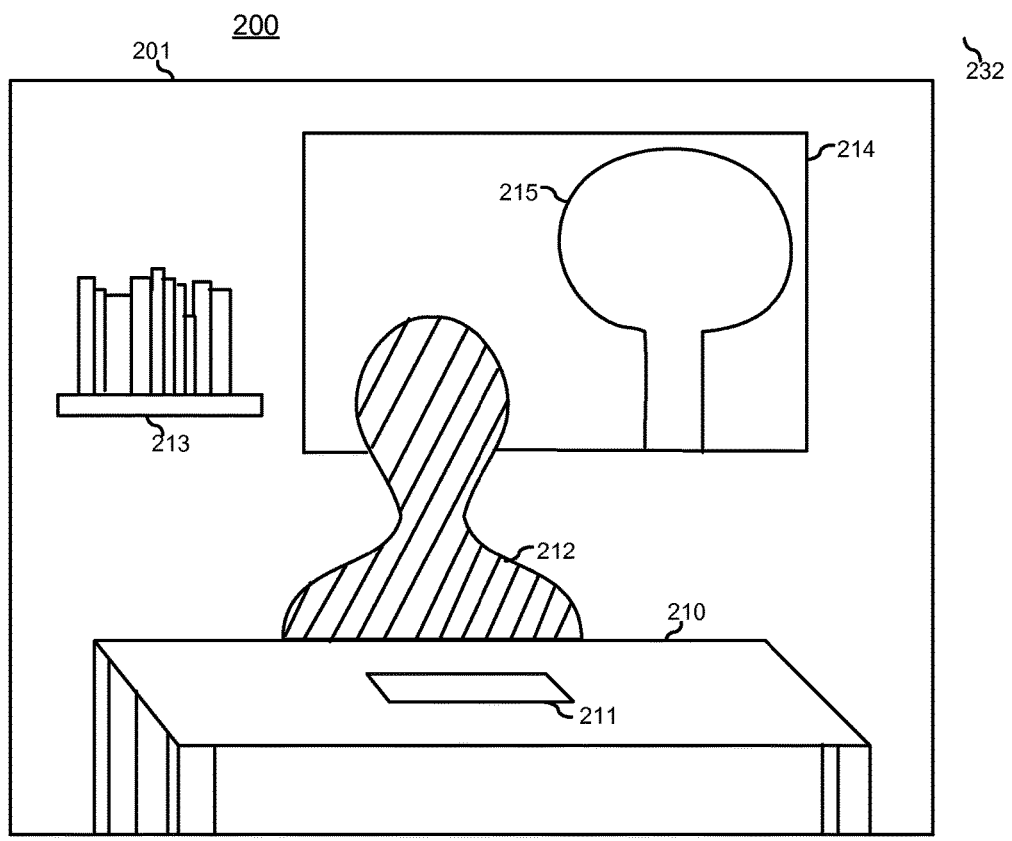
FIG. 2 is a display image diagram illustrating an image of a scene having objects at different distances from a three-dimensional (3D) camera, wherein the objects are represented by image elements, according to an embodiment of the present disclosure.

FIG. 2 is a display image diagram illustrating an image of a scene having objects at different distances from a three-dimensional (3D) camera, wherein the objects are represented by image elements, according to an embodiment of the present disclosure. Image 200 comprises a scene 201 having objects 210 through 215. Objects 210 through 215 are located at a variety of distances and ranges of depth of distance from a 3D camera, such as camera 156. For example, object 210, which represents a desk, is in a near foreground. Object 211, which represents a tablet, is illustrated as resting on object 211 and is also in the near foreground. Object 212, which represents a person sitting behind the desk, is illustrated in a moderate foreground, in a less extreme foreground position than object 210. Object 213, which represents a bookshelf on a wall behind the person represented by object 212, is in a moderate background relative to object 212. Object 214, which represents a window, is located in a depth plane substantially identical to that of object 213, so it is also in the moderate background. Object 215, which represents a tree visible through the window represented by object 214, is in a far background, farther from the 3D camera than objects 213 and 214 in the moderate background.

The three-dimensional relationships illustrated in FIG. 2 can be discussed with respect to x, y, and z axes, wherein the x axis is defined as being a horizontal axis, the y axis is defined as being a vertical axis, and the z axis is defined as being a distance axis along a path through the plane of image 200 away from a point of view of the 3D camera capturing image 200. In accordance with at least one embodiment, using distance information obtained from the 3D camera, the distances of image elements, such as pixels, of image 200 from the 3D camera can be determined. Patterns of such image elements, for example, image elements within the region occupied by object 212, can be recognized, for example, by their proximity in x, y, z space. Once recognized, such patterns can be used to identify objects, such as object 212 and its relation to other objects, such as objects 210, 211, and 213-215, in the x, y, z space. Then, image processing can be performed with respect to each identified object or plurality of objects that are at a particular z distance or range of z distances. By performing image processing on an object-by-object basis, or objects within a range of z-distances, the integrity of the appearance of each object can be preserved. For example, if object 214, as a window, provides a strong backlight that might otherwise result in other objects, such as object 212, being underexposed, object-by-object image processing, or processing by range of z-distances, can allow the exposure of object 214 to be reduced so it is not overexposed without necessarily reducing the exposure of object 212 and causing it to be underexposed. One or more additional images may be obtained using the 3D camera, for example, to alter the exposure of identified objects. As one example, a lesser exposure image may be made to reduce overexposure of a brighter object, such as object 214. Lesser exposure can be obtained, for example, by reducing exposure time, by reducing a lens aperture, by reducing a photoreceptor sensitivity, by adding or increasing a neutral density filter, or by another technique. As another example, a greater exposure image may be made to increase underexposure of a darker object. Greater exposure can be obtained, for example, by increasing exposure time, by increasing a lens aperture, by increasing photoreceptor sensitivity, by removing or decreasing a neutral density filter, or by applying illumination. Illumination may be applied, for example, by turning on an illumination source, such as a light associated with the camera. The intensity of such illumination may be modulated, for example, using pulse width modulation, to provide precise control over the amount of illumination being applied.

Figure 3:
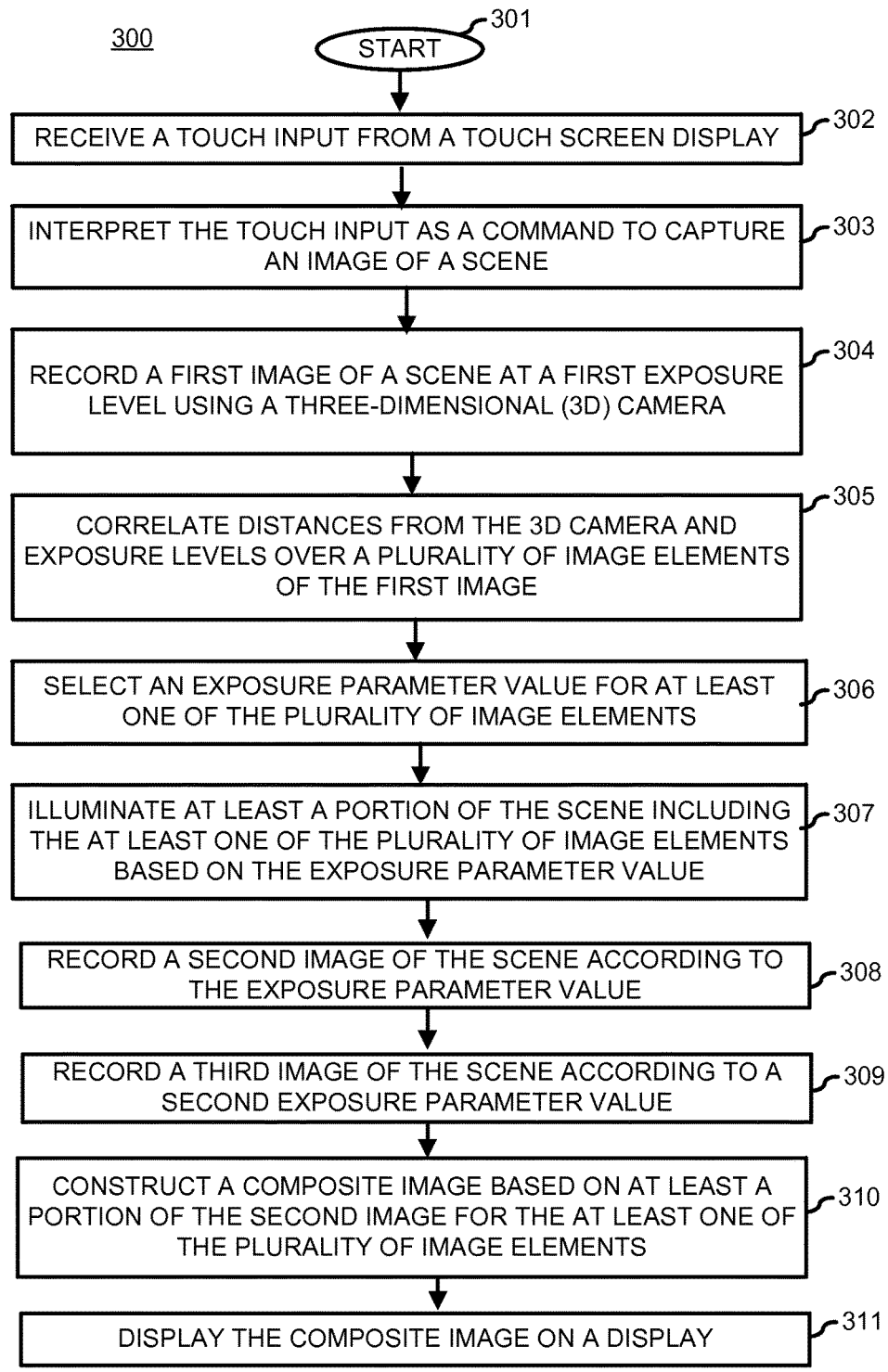
FIG. 3 is a flow diagram illustrating a method of constructing a composite image by controlling exposures based on distances of image elements from a 3D camera according to an embodiment of the present disclosure.

FIG. 3 is a flow diagram illustrating a method of constructing a composite image by controlling exposures based on distances of image elements from a 3D camera according to an embodiment of the present disclosure. In accordance with at least one embodiment, a method is performed in an electronic information handling system. Method 300 begins in block 301. From block 301, method 300 continues to block 302. In block 302, a touch input is received from a touch screen display. From block 302, method 300 continues to block 303. In block 303, the touch input is interpreted as a command to capture an image of a scene. From block 303, method 300 continues to block 304. In block 304, a first image of a scene is recorded at a first exposure level using a 3D camera. From block 304, method 300 continues to block 305. In block 305, distances from the 3D camera and exposure levels are correlated over a plurality of image elements of the first image. From block 305, method 300 continues to block 306. In block 306, an exposure parameter value is selected for at least one of the plurality of image elements located falling within a range of z-distance values. A range of z-distance values for an image element, moreover, may comprise one specific z-distance value or a plurality of z-distance values. This image element may represent part of an object in an image as described above. From block 306, method 300 continues to block 307. In block 307, at least a portion of the scene is illuminated, including the at least one of the plurality of image elements based on the exposure parameter value. From block 307, method 300 continues to block 308. In block 308, a second image of the scene is recorded according to the exposure parameter value. From block 308, method 300 continues to block 309. In block 309, a second exposure parameter value is selected for at least another of the plurality of image elements falling within a range of z-distance values including having one specific z-distance value or corresponding to a portion of an object, and a third image of the scene is recorded according to the second exposure parameter value. From block 309, method 300 continues to block 310. In block 310, a composite image is constructed based on at least a portion of the second image for the at least one of the plurality of image elements. As an example, the composite image can be constructed based on the at least the portion of the second image for the at least one of the plurality of image elements and based on at least a portion of the third image for the at least another of the plurality of image elements. As another example, the composite image can be constructed based on the at least a portion of the second image for the at least one of the plurality of image elements and based on at least a portion of the first image for at least another of the plurality of image elements. From block 310, method 300 continues to block 311. In block 311, the composite image is displayed on a display.

In accordance with at least one embodiment, method 300 further comprises illuminating at least a portion of the scene including the at least one of the plurality of image elements based on the exposure parameter value. As an example, the illuminating comprises modulating an illumination source on the 3D camera in accordance with the exposure parameter value. In accordance with at least one embodiment, selection of an attribute selected from a group consisting of an illumination source for the 3D camera, an exposure speed of the 3D camera, and a sensitivity of the 3D camera is based on the exposure parameter value. In accordance with at least one embodiment, constructing the composite image based on at least the portion of the second image for the at least one of the plurality of image elements comprises constructing the composite image from portions of a plurality of images recorded according to different exposure parameter values, wherein the portions of the plurality of images comprise the at least the portion of the second image and the different exposure parameter values comprise, for the at least the portion of the second image, the exposure parameter value, and wherein the portions correspond to different objects located at different distances of the distances from the 3D camera. For example, by identifying objects in images based on the proximity of image elements to each other using information obtained from a 3D camera, including the distances of the objects from the 3D camera, image processing can be performed on an object-by-object basis. Accordingly, a best representation of each object can be obtained from multiple instances of images that include image elements corresponding to the object, for example multiple instances of images recorded according to different exposure parameter values. These best representations of the objects are then composited together to form a composite image depicting the plurality of objects in their proper spatial relationships. In accordance with at least one embodiment, the exposure parameter value is selected for a group of the plurality of image elements within a depth range of a distance of the distances.

Figure 4:
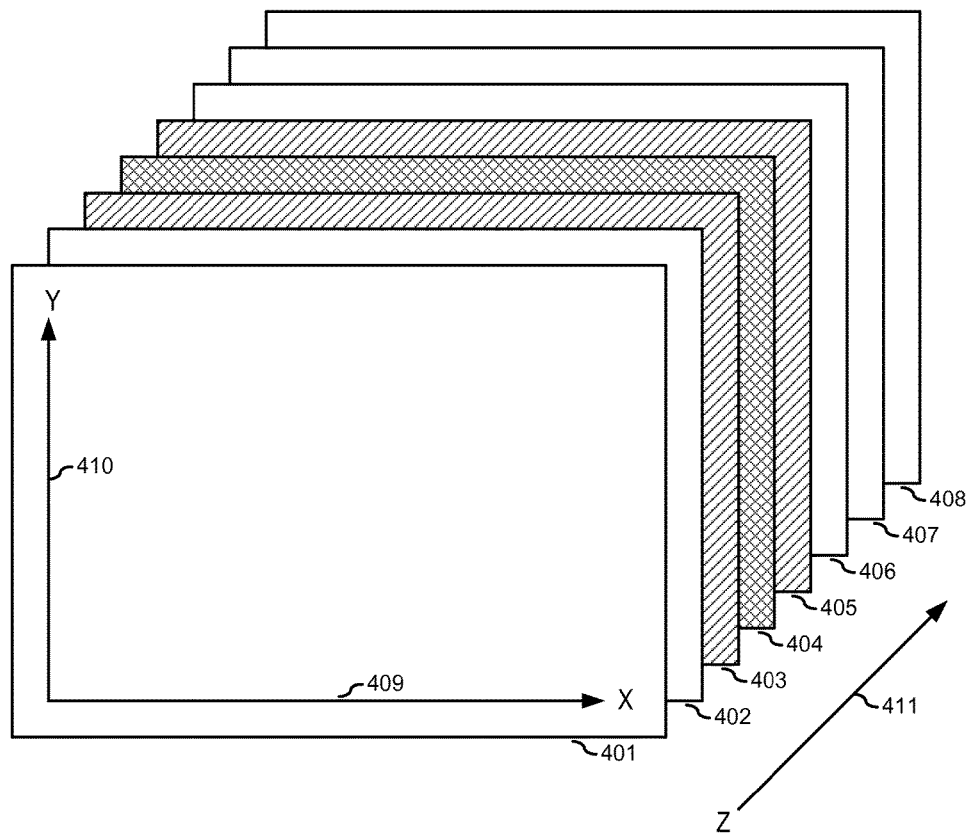
FIG. 4 is a block diagram illustrating a range of depth of distances of objects in a scene from a 3D camera among other distances and their relative spatial relationships according to an embodiment of the present disclosure.

FIG. 4 is a block diagram illustrating a range of depth of distances of objects in a scene from a 3D camera among other distances and their relative spatial relationships according to an embodiment of the present disclosure. In the illustrated example, image elements may be considered to be located at a z-distance from a point of view of a 3D camera that places them in any of distance planes 401-408 located at different distances along a z axis 411. Each of distance planes 401-408 spans a range of area defined with respect to x axis 409 and y axis 410. As shown by crosshatching, image elements representing an object in a scene may lie substantially in distance plane 404. As further shown by shading of adjacent distance planes 403, which is nearer to a point of view, and 405, which is farther from a point of view, a thickness sufficient to include image elements substantially within distance planes 403, 404, and 405 can be recognized as representing an object, such as object 212. Exposure of an image containing the object can be adjusted and optimized over an area of the image that corresponds to the object. Such adjustment and optimization can be performed independent of the exposure of objects in other distance planes, such as distance planes 401, 402, and 406-408.

The adjustment of exposure for an object within a range of depth of distance may be uniform over the extent of the object in the x, y, and z directions, or the filter may be applied non-uniformly over the range. As one example, to provide a more gradual transition between the exposure adjustment to the portion of the object in distance plane 404 and the non-application of the exposure adjustment to other objects outside of the distance plane or planes occupied by the object to which the exposure adjustment is being made, the degree to which the exposure adjustment is applied may be tapered to lesser degrees for portions of the object farther from distance plane 404. For example, a full degree of exposure adjustment may be applied to fully adjust a portion of the object in distance plane 404, while the exposure adjustment may be applied to a lesser degree to portions of the object in distance planes 403 and 405. If the object were found, based on the distance information provided by the 3D camera, to also occupy distance planes 402 and 406, the exposure adjustment could be applied to an even lesser degree to the portions of the object in distance planes 402 and 406, as they are less proximate to distance plane 404 than distance planes 403 and 405 are to distance plane 404.

Figure 5:
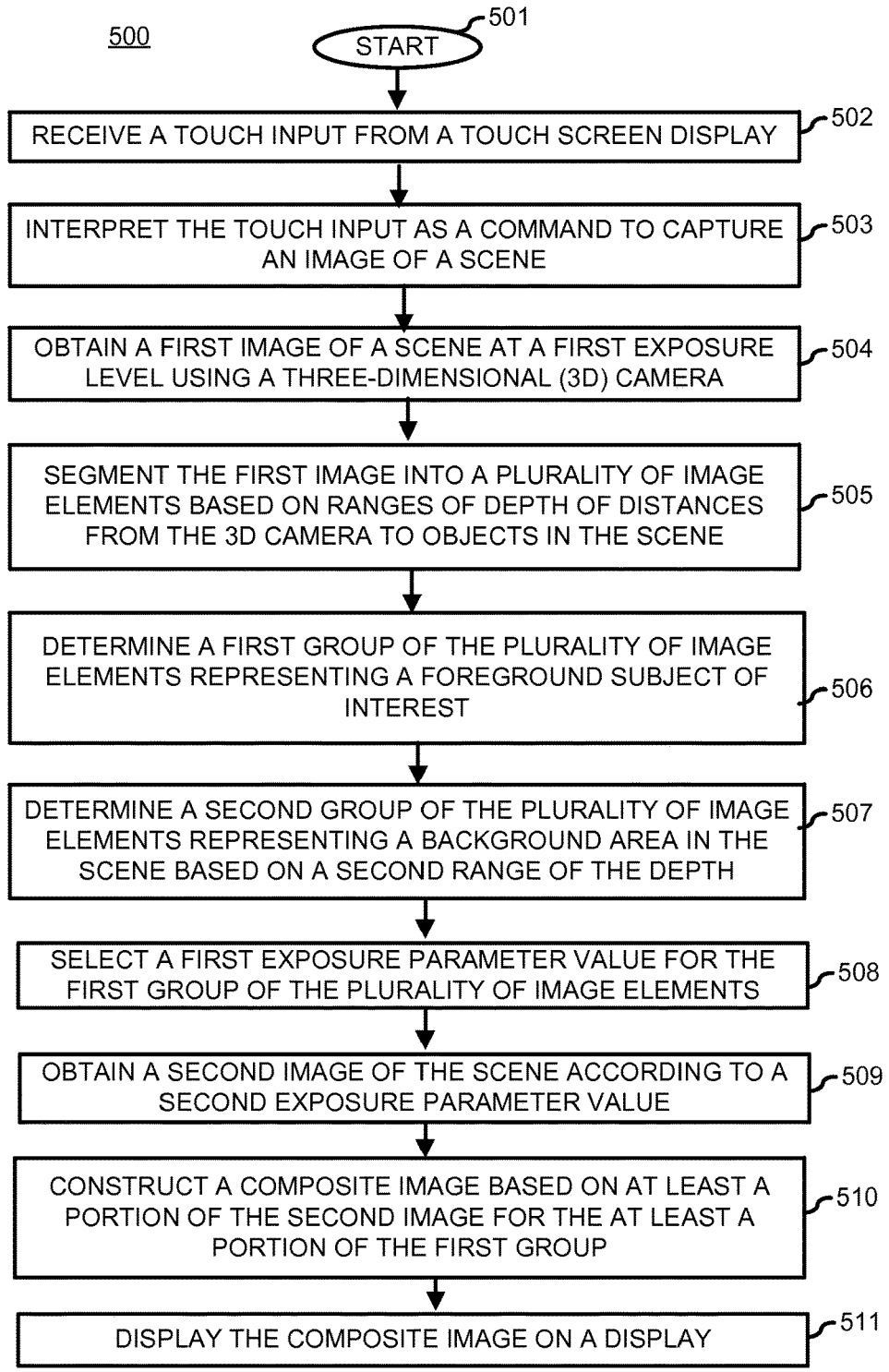
FIG. 5 is a flow diagram illustrating a method of constructing a composite image by controlling exposures based on distances of image elements from a 3D camera according to an embodiment of the present disclosure.

FIG. 5 is a flow diagram illustrating a method of constructing a composite image by controlling exposures based on distances of image elements from a 3D camera according to an embodiment of the present disclosure. In accordance with at least one embodiment, a method is performed in an electronic information handling system. Method 500 begins in block 501. From block 501, method 500 continues to block 502. In block 502, a touch input is received from a touch screen display. From block 502, method 500 continues to block 503. In block 503, the touch input is interpreted as a command to capture an image of a scene. From block 503, method 500 continues to block 504. In block 504, a first image of a scene is obtained at a first exposure level using a 3D camera. From block 504, method 500 continues to block 505. In block 505, the first image is segmented into a plurality of image elements based on ranges of depth of distances from the 3D camera to objects in the scene. From block 505, method 500 continues to block 506. In block 506, a first group of the plurality of image elements representing a foreground subject of interest is determined. From block 506, method 500 continues to block 507. In block 507, a second group of the plurality of image elements representing a background area in the scene is determined based on a second range of the depth. From block 507, method 500 continues to block 508. In block 508, a first exposure parameter value for the first group of the plurality image elements is selected. From block 508, method 500 continues to block 509. In block 509, a second image of the scene is obtained according to a second exposure parameter value. From block 509, method 500 continues to block 510. In block 510, a composite image is constructed based on at least a portion of the second image for the at least a portion of the first group. From block 510, method 500 continues to block 511. In block 511, a display image is displayed on the touch screen display.

In accordance with at least one embodiment, the method further comprises selecting a second exposure parameter value for at least another of the plurality of image elements and obtaining a third image of the scene according to the second exposure parameter value, wherein the constructing further comprises constructing the composite image based on the at least the portion of the second image for the at least the portion of the first group of the plurality of image elements and based on at least a portion of the third image for the at least a portion of the second group of the plurality of image elements. In accordance with at least one embodiment, the constructing further comprises constructing the composite image based on the at least a portion of the second image for the at least the portion of the first group of the plurality of image elements and based on at least a portion of the first image for at least a portion of the second group of the plurality of image elements. In accordance with at least one embodiment, the method further comprises illuminating at least a portion of the scene including the at least the portion of the first group of the plurality of image elements based on the first exposure parameter value. In accordance with at least one embodiment, the illuminating comprises modulating an illumination source for the 3D camera in accordance with the exposure parameter value. In accordance with at least one embodiment, the selecting the first exposure parameter value for the first group of the plurality of image elements further comprises selecting the exposure parameter value for the first group of the plurality of image elements within a range of the ranges of the depths of the distances.

In accordance with at least one embodiment, a method in an electronic information handling system comprises recording a first image of a scene at a first exposure level using a three-dimensional (3D) camera, recording a second image of the scene at a second exposure level using the 3D camera, selecting a selected image element from among a first image element of the first image and a second image element of the second image based on a distance value representing a distance of the first image element and the second image element from the 3D camera, and constructing a constructed image from the selected image element combined with other selected image elements having other distance values.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method in an electronic information handling system comprising:
   recording a first image of a scene at a first exposure level using a three-dimensional (3D) camera;
   correlating distances from the 3D camera and exposure levels over a plurality of image elements of the first image;
   selecting a first exposure parameter value for at least one of the plurality of image elements having a z-distance value falling within a range of z-distance values;
   recording a second image of the scene according to the first exposure parameter value selected for the at least one of the plurality of image elements having a second exposure level; and
   constructing a composite image based on at least a portion of the second image for the at least one of the plurality of image elements.

2. The method of claim 1 further comprising:
   selecting a second exposure parameter value for at least another of the plurality of image elements having a different z-distance value falling within another range of z-distance values;
   recording a third image of the scene according to the second exposure parameter value, wherein the constructing further comprises constructing the composite image based on the at least the portion of the second image for the at least one of the plurality of image elements and based on at least a portion of the third image for the at least another of the plurality of image elements.

3. The method of claim 1 wherein the constructing further comprises constructing the composite image based on the at least a portion of the second image for the at least one of the plurality of image elements and based on at least a portion of the first image for at least another of the plurality of image elements.

4. The method of claim 1 further comprising:
   illuminating at least a portion of the scene including the at least one of the plurality of image elements based on the exposure parameter value.

5. The method of claim 4 wherein the illuminating comprises:
   modulating an illumination source on the 3D camera in accordance with the exposure parameter value.

6. The method of claim 1 wherein the constructing the composite image based on the at least the portion of the second image for the at least one of the plurality of image elements comprises:
   constructing the composite image from portions of a plurality of images recorded according to different exposure parameter values, wherein the portions of the plurality of images comprise the at least the portion of the second image and the different exposure parameter values comprise, for the at least the portion of the second image, the exposure parameter value, and wherein the portions correspond to different objects located at different distances of the distances from the 3D camera.

7. The method of claim 1 wherein the selecting the exposure parameter value for the at least one of the plurality of image elements further comprises:
   selecting the exposure parameter value for a group of the plurality of image elements within a depth range of z-distance values.

8. An information handling system comprising:
   a three-dimensional (3D) camera for recording a first image of a scene at a first exposure level;
   a processor coupled to the 3D camera; and
   memory coupled to the processor, the memory for storing instructions executable by the processor, the instructions, when executed by the processor, for causing the processor to correlate distances from the 3D camera and exposure levels over a plurality of image elements of the first image, to select a first exposure parameter value for at least one of the plurality of image elements having a z-distance value falling within a range of z-distance values, to record a second image of the scene according to the first exposure parameter value selected for at least one of the plurality of image elements having the z-distance value falling within the range of z-distance values, and to construct a composite image based on at least a portion of the second image for the at least one of the plurality of image elements.

9. The information handling system of claim 8 wherein the memory stores further instructions, when executed by the processor, for causing the processor to select a second exposure parameter value for at least another of the plurality of image elements having a different z-distance value falling within another range of z-distance values, and to record a third image of the scene according to the second exposure parameter value, wherein the constructing further comprises constructing the composite image based on the at least the portion of the second image for the at least one of the plurality of image elements and based on at least a portion of the third image for the at least another of the plurality of image elements.

10. The information handling system of claim 8 wherein the instructions for causing the processor to construct the composite image further comprise instructions for causing the processor to construct the composite image based on the at least a portion of the second image for the at least one of the plurality of image elements and based on at least a portion of the first image for at least another of the plurality of image elements.

11. The information handling system of claim 8 wherein the memory stores further instructions, when executed by the processor, for causing the processor to control illumination of at least a portion of the scene including the at least one of the plurality of image elements based on the exposure parameter value.

12. The information handling system of claim 11 further comprising:
an illumination source configured to be modulated in accordance with the exposure parameter value.

13. The information handling system of claim 8 wherein the instructions cause the processor to select an attribute value of an attribute selected from a group consisting of an illumination source on the 3D camera, an exposure speed of the 3D camera, and a sensitivity of the 3D camera is based on the exposure parameter value.

14. The information handling system of claim 8 wherein the instructions for causing the processor to select the exposure parameter value for the at least one of the plurality of image elements further comprise instructions for causing the processor to select the exposure parameter value for a group of the plurality of image elements within a depth range of z-distance values.

15. A method in an electronic information handling system comprising:
obtaining a first image of a scene at a first exposure level using a three-dimensional (3D) camera;
segmenting the first image into a plurality of image elements based on ranges of depth of z-distances from the 3D camera to objects in the scene;
determining a first group of the plurality of image elements representing a foreground object of interest in the scene based on a first range of the depth of z-distances;
determining a second group of the plurality of image elements representing a background area in the scene based on a second range of the depth of z-distances;
selecting a first exposure parameter value for the first group of the plurality of image elements;
obtaining a second image of the scene according to the first exposure parameter value selected for the first group of the plurality of image elements; and
constructing a composite image based on at least a portion of the second image for at least a portion of the first group of the plurality of image elements.

16. The method of claim 15 further comprising:
selecting a second exposure parameter value for at least another of the plurality of image elements;
obtaining a third image of the scene according to the second exposure parameter value, wherein the constructing further comprises constructing the composite image based on the at least the portion of the second image for the at least the portion of the first group of the plurality of image elements and based on at least a portion of the third image for the at least a portion of the second group of the plurality of image elements.

17. The method of claim 15 wherein the constructing further comprises constructing the composite image based on the at least a portion of the second image for the at least the portion of the first group of the plurality of image elements and based on at least a portion of the first image for at least a portion of the second group of the plurality of image elements.

18. The method of claim 15 further comprising:
illuminating at least a portion of the scene including the at least the portion of the first group of the plurality of image elements based on the first exposure parameter value.

19. The method of claim 18 wherein the illuminating comprises:
modulating an illumination source for the 3D camera in accordance with the exposure parameter value.

20. The method of claim 15 wherein the selecting the first exposure parameter value for the first group of the plurality of image elements further comprises:
selecting the exposure parameter value for the first group of the plurality of image elements within a subset range within the first range of the depth of z-distances.

* * * * *